(12) United States Patent
Giselbrecht et al.

(10) Patent No.: US 8,506,833 B2
(45) Date of Patent: Aug. 13, 2013

(54) MOLDED BODY, METHOD FOR PRODUCING THE BODY AND USE THEREOF

(75) Inventors: Stefan Giselbrecht, Karlsruhe (DE); Roman Truckenmüller, Flein (DE); Christina Trautmann, Darmstadt (DE)

(73) Assignee: Karlsruhe Institute of Technology, Karlsruhe (DE)

(*) Notice: Subject to any disclaimer, the term of this patent is extended or adjusted under 35 U.S.C. 154(b) by 309 days.

(21) Appl. No.: 12/695,653

(22) Filed: Jan. 28, 2010

(65) Prior Publication Data

US 2010/0126965 A1    May 27, 2010

Related U.S. Application Data

(62) Division of application No. 11/632,849, filed as application No. PCT/EP2005/007043 on Jun. 30, 2005, now abandoned.

(51) Int. Cl.
*B01D 67/00* (2006.01)
*B01D 69/00* (2006.01)
*B01D 71/00* (2006.01)

(52) U.S. Cl.
USPC .......... 216/56; 216/11; 216/83; 216/87; 216/94; 264/317; 264/340; 264/413; 264/488

(58) Field of Classification Search
USPC .......... 216/56, 87, 11, 83, 94; 264/413, 264/317, 340, 488
See application file for complete search history.

(56) References Cited

U.S. PATENT DOCUMENTS

| 4,364,723 A | 12/1982 | Louis et al. |
| 5,637,925 A * | 6/1997 | Ludden et al. ............ 257/774 |
| 6,908,552 B2 * | 6/2005 | Siwy et al. ............ 210/500.39 |
| 7,261,950 B2 | 8/2007 | Fleming et al. |
| 2003/0087083 A1 * | 5/2003 | Ferain et al. ............ 428/315.5 |
| 2004/0067585 A1 | 4/2004 | Wang et al. |
| 2005/0247470 A1 * | 11/2005 | Fleming et al. .......... 174/35 MS |

FOREIGN PATENT DOCUMENTS

| DE | 413 2379 | 4/1993 |
| EP | 0 305 123 | 3/1989 |
| SU | 1763452 | * 9/1992 |
| WO | WO-2004/040206 A1 | 5/2004 |

OTHER PUBLICATIONS

International Search Report Dated Sep. 21, 2005 for PCT/EP2005/007043, Together With Written Opinion Form PCT/ISA/237.
Fleischer et al., Nuclear Tracks in Solids Principles and Applications, University of California Press, Copyright 1975, by The Regents of the University of California, pp. 64, 77-79, 83.

* cited by examiner

*Primary Examiner* — Lan Vinh
*Assistant Examiner* — David Kaufman
(74) *Attorney, Agent, or Firm* — Venable LLP; Robert Kinberg; Tamatane J. Aga (57) ABSTRACT

A method for producing a molded body, said method comprising: providing a film comprising a thermoplastic plastic and having a film thickness D ranging from 1 μm to 1000 μm; irradiating the film with ionizing radiation, to produce irradiated regions in the film; thermally reshaping the film into a molded body and generating at least one hollow structure, wherein a temperature of the thermal reshaping remains below the melting temperature for the thermoplastic plastic; removing the irradiated regions, to create pores having a diameter δ from about 10 nm to about 10 μm in the molded body; and removing the molded body from a mold.

5 Claims, 6 Drawing Sheets

MOLDED BODY, METHOD FOR PRODUCING THE BODY AND USE THEREOF

CROSS-REFERENCE TO RELATED PATENT APPLICATIONS

This application is a divisional of U.S. patent application Ser. No. 11/632,849, filed Jan. 19, 2007, which in turn is a national stage application of PCT International Patent Application No. PCT/EP2005/007043, filed Jun. 30, 2005 designating the United States, and claiming the priority of German Patent Application No. 10 2004 035 267.4, filed Jul. 21, 2004, the subject matter of each above-mentioned application is herein being incorporated by reference in its entirety.

BACKGROUND OF THE INVENTION

The invention relates to a molded body into which at least one hollow structure is configured, wherein the film and the at least one hollow structure contain a plurality of pores. The invention furthermore relates to a method for producing the molded body and the use thereof.

Commonly used methods for producing micro-perforated films (membranes) are based either on directed physical processes such as the ion-trace technology, the laser micro-perforation, or the lithography, on special precipitation methods such as the phase inversion, or on drawing processes. Whereas the latter two processes are primarily used for producing flat micro-filtration and ultra-filtration membranes, the directed physical processes are generally used for the micro-perforation of micro-structures. In combination with technical micro-structuring processes, such as the micro injection-molding or the hot stamping, however, these processes can be used only with already existing three-dimensional microstructures.

To be sure, perforating all sides of a microstructure of this type by turning and rotating the structure is conceivable in principle, for example when subjecting it to radiation, but can be realized only at high expense and only with individual, free-standing structures. In the case of several adjacent structures (structure array), at most a micro-perforation that is perpendicular or at a slight angle to the structural plane is possible.

SUMMARY OF THE INVENTION

Starting from this point, it is the object of the present invention to propose a molded body, a method for producing said body and the use thereof, which do not have the aforementioned disadvantages and limitations. In particular, it is the object to provide a molded body with three-dimensional, thin-walled hollow structures of polymer that are perforated on all sides and have a defined pore size between 10 nm and 10 µm.

A molded body according to the invention consists of a film (membrane) having a film thickness D ranging from 1 µm to 1000 µm, preferably from 10 µm to 100 µm, wherein the film thickness advantageously remains nearly constant over large areas (several square meters). The film itself advantageously consists of a thermoplastic plastic material, preferably polymethylmethacrylate (PMMA), polycarbonate (PC), polyethyleneterephthalate (PET), polystyrene (PS), polyimide (PI), polypropylene (PP), polyvinylidenfluoride (PVDF), or cycloolefin copolymer (COC).

At least one hollow structure (cavity) is configured into the film, wherein the geometric dimensions of said structure are expressed with the following values:

The outside diameter d of the hollow structure has a value that is at least double the value of the film thickness D:

$$d \geq 2*D \quad (1)$$

and especially preferred is at least three times the value of the film thickness D.

The height h (depending on the view, it may be the depth) of the hollow structure is at most double the value of the outside diameter d:

$$h:d \leq 2:1 \quad (2)$$

The wall strength (wall thickness) b of the hollow structure is approximately the same or is lower by one order of magnitude than the film thickness D, meaning it assumes a value between 0.02 times the film thickness D and the film thickness D:

$$0.02*D \leq b \leq D \quad (3)$$

The value for the local curvature radius r of the hollow structure is on the order of magnitude of the respective local wall thickness b, meaning it has a value between 0.2 times and 5 times the wall thickness b:

$$0.2*b \leq r \leq 5*b \quad (4)$$

According to one preferred embodiment, the hollow structure is provided with an undercut and consequently assumes the cross-sectional form of a Ω structure. In cases where the values for the film thickness D, the outside diameter d of the hollow structure, and the height h of the hollow structure is the same—wherein the equation (1) must still be met—this results in a Ω structure with distinctive distribution function for the wall thickness b.

Several hollow structures, preferably a plurality of hollow structures, are configured into the film, wherein the respective value for the distance g between these structures corresponds at least to the outside diameter d of the respective hollow structures:

$$g \geq d \quad (5)$$

This lower limit for the spacing (minimum distance) essentially follows from the mechanical resistance of the reshaping tool for the film. Depending on the type of material and the production method, extremely narrow webs having a width of a few micrometers, which are still stable with respect to the shaping operation, can thus be produced.

Finally, the molded body, meaning the film and the hollow structures, contains a plurality of pores for which the respective diameter δ preferably has a value between 10 nm and 10 µm. It is preferable if the pores are distributed statistically across the complete molded body, meaning the film as well as the hollow structures, wherein it is possible for individual pores to overlap. According to one alternative embodiment, the pores are distributed in an orderly arrangement and with a spacing β across the film and the hollow structures.

A molded body according to the invention can be produced with the following method steps. According to method step a), a film is initially provided with a thickness between 1 µm and 1000 µm, preferably between 10 µm and 100 µm, wherein this film advantageously consists of polymethylmethacrylate (PMMA), polycarbonate (PC), polyethyleneterephthalate (PET), polystyrene (PS), polyimide (PI), polypropylene (PP), polyvinylidenfluoride (PVDF), or cycloolefin copolymer (COC).

The film is subsequently irradiated with ionizing radiation, as specified in method step b), such that irradiated regions are created within the film. Heavy ions are preferably used for irradiating the film, for example ions of the type $^{132}Xe^{21+}$. The specific energy should be selected at least high enough to ensure the penetration of the film. The fluence of the heavy ions is selected such that it can be used to adjust the average pore density per surface area. The heavy ions preferably have a specific energy above 0.1 MeV/nucleon.

An approximately 90° angle is advantageously used for irradiating the film surface, meaning the film is positioned substantially perpendicular to the direction of the heavy ion beam. Any other type of ionizing radiation, which allows configuring regions in the film that are removed during a later processing step as pores of a suitable size, can be used in place of the heavy ions. In addition, masks can also be used for irradiating the film, so as to produce locally delimited areas and/or regions of perforation, which are to be dissolved out completely.

It is critical for the method according to the invention that the film is reshaped thermally into a molded body during the following method step c), for example by using the process known as micro-thermoforming. During the thermoforming process, the film is reshaped in an entropy-elastic phase and not in a melting phase of the plastic, so that the correlation between the radiation dose and the irradiated location is not lost. It is important that the temperature remains in the range of softening temperature (glass-transition temperature) for the thermoplastic plastic, meaning below its melting temperature, to avoid a healing of the traces and/or a blurring of the locally deposited dose. This goal is reached with the comparably low reshaping temperature and the short reshaping duration.

The method according to the invention is based on inserting the intermediate technical step of reshaping through micro-structuring between the step of irradiating the polymer substrate and the processing step that would normally follow it. Critical for the proposed method is the thermoforming of a locally modified polymer material with the aid of ionizing radiation to allow a later removal of these regions to generate perforated or net-type thin-walled three-dimensional hollow structures.

In order to perforate the side walls and the bottom of thin-walled, three-dimensional micro cavities, a flat semi-finished technical film is subjected to an ionizing radiation, preferably with ionizing particles. In contrast to the traditional method for producing perforated membranes, the irradiated film with the existing latent traces is therefore micro-structured before (!) the pores are generated by means of etching and then dissolving.

For this type of reshaping, micro-technical processes can be used for which the polymer does not transition to a liquid-melt phase since all traces are otherwise healed and/or a blurring of the locally deposited dose occurs. Micro-thermoforming, however, is a micro-technical process with an entropy-elastic state during the forming process, so that the material cohesion of the polymer is ensured since the thermoplastic material is deformed only in the range immediately surrounding its plasticizing temperature.

In the same was as for the macroscopic thermoforming, thermoplastic semi-finished products are spatially drawn in a negative form in order to thin the wall thickness. By drawing the thermoplastic materials, the applied traces are retained per se, but change their position relative to each other, corresponding to the respective local drawing, meaning the trace density per surface unit decreases with increasing drawing.

Following the three-dimensional micro structuring through micro-thermoforming of the thermoplastic film, which continues to be closed, the irradiated regions can then be freely etched and/or dissolved with a suitable substance because of their changed physical properties, as disclosed in method step d). As a result, pores are formed in the molded body, which preferably have a diameter δ between 10 nm and 10 μm. According to a particularly preferred embodiment, the irradiated regions in the molded body are removed (dissolved) with the aid of wet chemical etching, for example by using a strong alkaline solution. The desired pore diameter is adjusted via the parameters (duration, temperature) for the etching step.

Finally, according to method step e), the molded body produced according to the invention is removed from the mold. This molded body represents a three-dimensional hollow structure with thin walls, provided with pores of a defined size in all regions of the side walls and the bottom, wherein these are furthermore aligned in all regions mostly perpendicular to the wall.

The molded bodies produced with the method according to the invention have many different uses. A molded body comprising a single or several hollow structures can be used as housing for micro-structured parts (components) or for collecting micro-particles and/or nano-particles. The surfaces of the aforementioned particles can be functionalized, for example, through perfusion of various reaction means.

Molded bodies with hollow structures that have an inside diameter $d_i$, obtained by using the outside diameter d minus double the wall thickness b, as well as a height h in the range of 10-50 μm, can furthermore be used for individual biological or pharmaceutical analyses of bio-molecules, as well as prokaryotic or eukaryotic cells.

Molded bodies with hollow structures that have an inside diameter $d_i$ as well as a height h in the range of 50-500 μm, for which the dimensions are consequently in the range of standard spheroids, can be used for the three-dimensional cultivation of prokaryotic or eukaryotic cells. Examples for this are the cultivation of cells for studying angiogenesis, invasiveness (tumor research), or cell-to-cell communication.

According to one preferred embodiment, several and/or a plurality of hollow structures are arranged in a single plane, wherein it is possible to arrange the hollow structures in a row or to have a planar distribution across the complete film or parts of the film. In the latter case, the hollow structures are preferably arranged in rows and columns and/or are in a staggered arrangement.

Molded bodies of this type can be used as addressable cavities for immobilizing and/or magazining micro-particles or nano-particles, for which the surfaces can be functionalized through perfusion of reaction media.

One preferred use of the molded bodies according to the invention is in the form of a micro-structured cell culture carrier for the three-dimensional cultivation of prokaryotic or eukaryotic cells, for example as disclosed in reference DE 41 32 379 A1. This allows the immobilizing of cells supplied by perfusing media, wherein the preferred parameters are:

| foil thickness D: | 20-100 μm |
| --- | --- |
| wall thickness b: | 5-10 μm |
| hollow structure: | inside diameter $d_i$: 100-300 μm |
| | height h: 100-300 μm |

$10^6$-$10^7$ pores/cm$^2$ with diameter δ 1-5 μm

Molded bodies according to the invention are furthermore suitable for immobilizing enzymes or surface-active catalysts because of their increased surface area. Immobilized enzymes on the increased surface area make it possible to configure a biosensor, with the medium (fluid) flowing directly through it and not just around it.

Molded bodies according to the invention can be used with mechanical, thermal, electric, magnetic or chemical separation processes. In connection with suitable parameters for the film, molded bodies of this type can be used for the filtering out of micro-organisms, including viruses, bacterio-phages and/or or bacteria, or bio-molecules such as soluble proteins from a medium that is flowing through.

Molded bodies according to the invention are furthermore suitable for use as atomizers. Substances which do not mix while in the liquid phase are transferred from the pores of adjacent hollow structures in the form of finely-distributed drops (aerosols) and are mixed in this way.

According to a different preferred embodiment, a molded body according to the invention is rolled up simply or spirally, wherein the hollow structures are oriented either toward the inside or the outside. Alternatively, a molded body according to the invention can also be folded or have a corrugated shape. Finally, several molded bodies with the same or different parameters can be arranged side-by-side, one above the other, or can be nestled into each other and can be used, for example, for the membrane filtration.

In addition to the use for immobilizing enzymes or as surface-active catalysts, micro-particles or nano-particles can be separated serially according to their size, by means of several layers with a graduated pore size. Molded bodies of this type are also suitable for use as three-dimensional filters with defined pore size, for example for the material separation in the pharmaceutical industry, the biotechnical industry, and the like.

One or several molded bodies according to the invention in the form of a tube represent a module, having a considerably larger surface area as compared to a standard hollow fiber. A module of this type can be used, for example, for producing monoclonal antibodies or as extra-corporeal organ support system.

For a different area of application, these bodies can be used as thin-walled microscopic channel structures and reservoir structures with defined localized openings and/or pores of a defined size, which are used for taking samples, for the ventilation, for the material separation, and the like. Molded bodies of this type are also used, for example, in µ capillary electrophoresis chips or in lab-on-a-chip systems.

The invention in particular has the following advantages:
- easy irradiation of the flat polymer film prior to the micro-structuring process;
- easy irradiation of large unstructured surfaces, e.g. continuous webs of film;
- making it easier to use masks (direct mask contact) for producing locally delimited areas of perforation or regions, which must be are to be completely dissolved out;
- making possible the micro-perforation on all sides of three-dimensional micro-cavities;
- higher production safety since the step of irradiating the material is realized on cheaper semi-finished films, prior to the generally involved and cost-intensive micro-structuring operation, thereby avoiding the problem of rejects of existing and expensive micro-structures with defects caused by radiation.

BRIEF DESCRIPTION OF THE DRAWINGS

In the following, the invention is explained in further detail with the aid of exemplary embodiments and the Figures, which show in.

DETAILED DESCRIPTION

Figure 1:
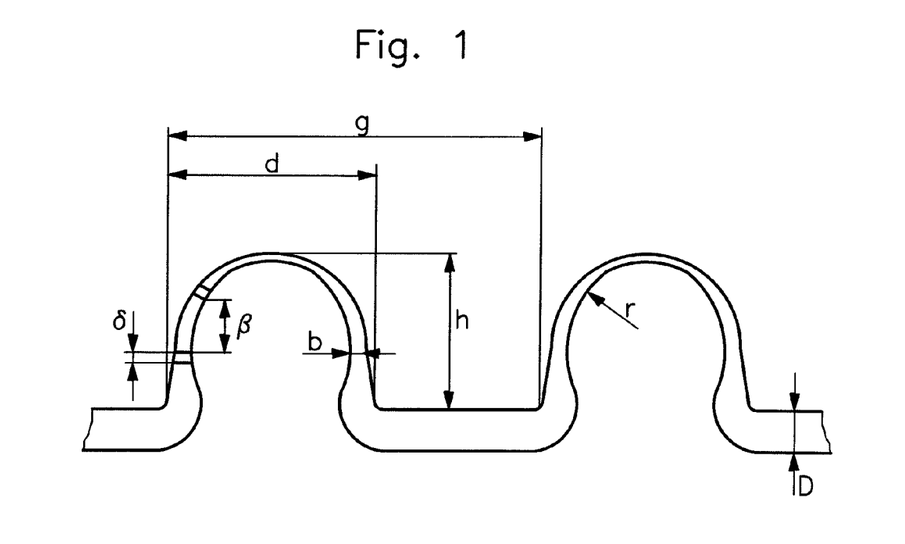
FIG. 1 A schematic cross section through a molded body with perforated hollow structures.

The view in FIG. 1 shows a schematic cross section through a molded body with perforated hollow structures. The individual parameters included with this Figure are:

| | |
|---|---|
| D | thickness of the film |
| d | outside diameter of the hollow structure |
| h | height of the hollow structure |
| b | wall thickness of the hollow structure |
| r | curvature radius for the hollow structure |
| g | spacing between two adjacent hollow structures |
| δ | pore diameter |
| β | spacing between pores |

Figure 2:
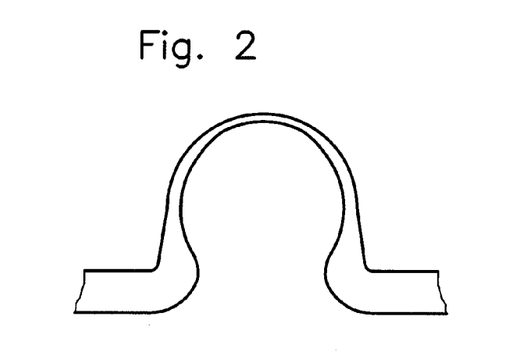
FIG. 2 A schematic cross section through a molded body with a hollow structure that is provided with an undercut (Ω structure).

FIG. 2 shows a schematic cross section through a molded body comprising a hollow structure with a real undercut, meaning a so-called Ω structure. The distinctive distribution function of the wall thickness b is visible in this view.

Figure 3:
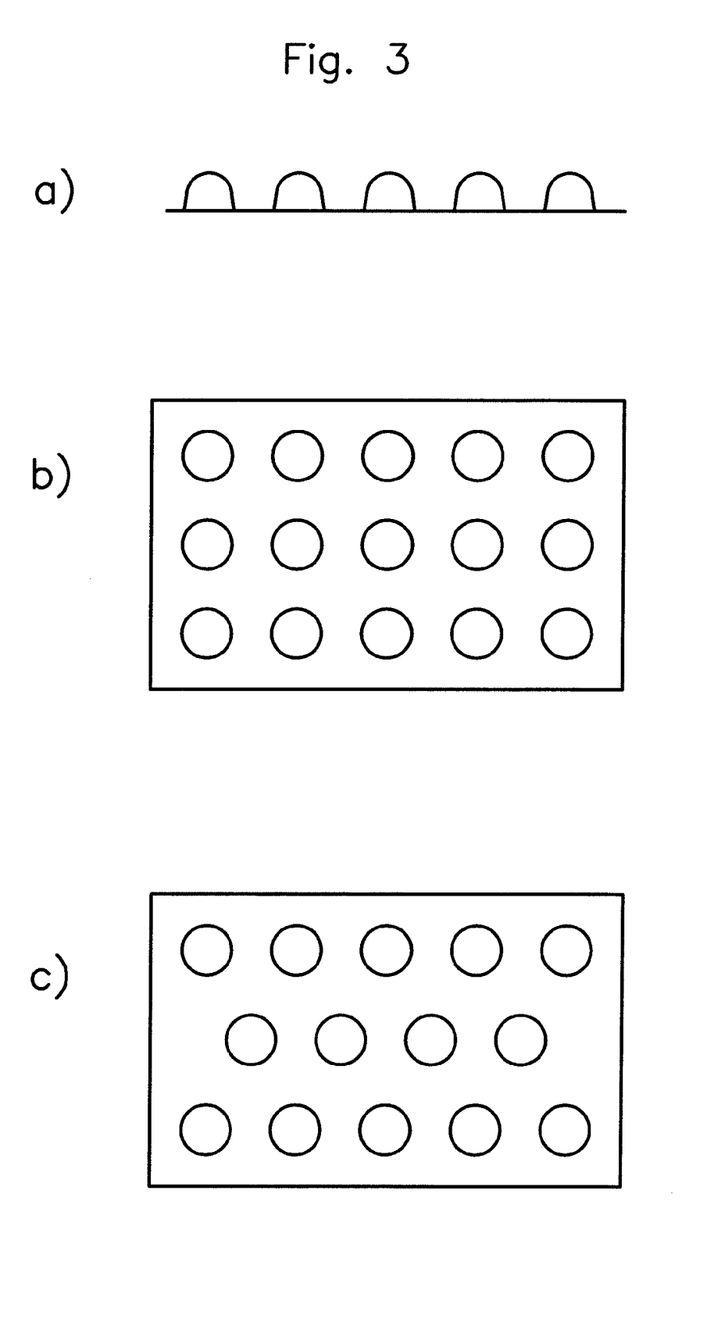
FIG. 3 A schematic cross section through an arrangement of several hollow structures in a single plane:
a) in a row;
b) planar, in the form of rows and columns;
c) planar, in a staggered arrangement.
Figure 4:
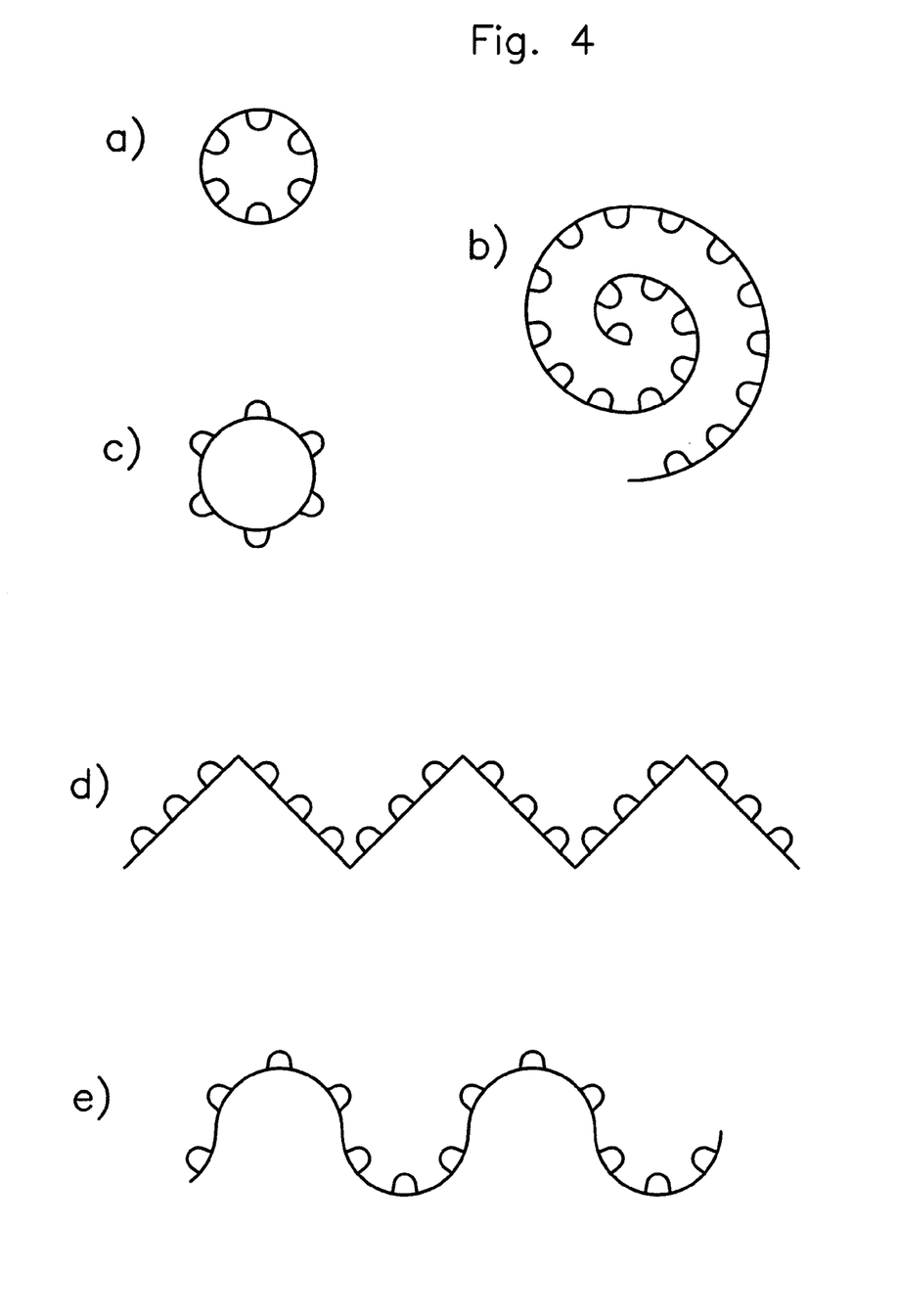
FIG. 4 Schematic cross-sections through three-dimensional arrangements of hollow structures:
a) rolled up singly with hollow structures directed toward the inner area;
b) rolled up spirally with hollow structures directed toward the inner area;
c) rolled up singly with hollow structures directed toward the outer area;
d) rolled out in a triangular arrangement;
e) rolled out in a circular arrangement.
Figure 5:
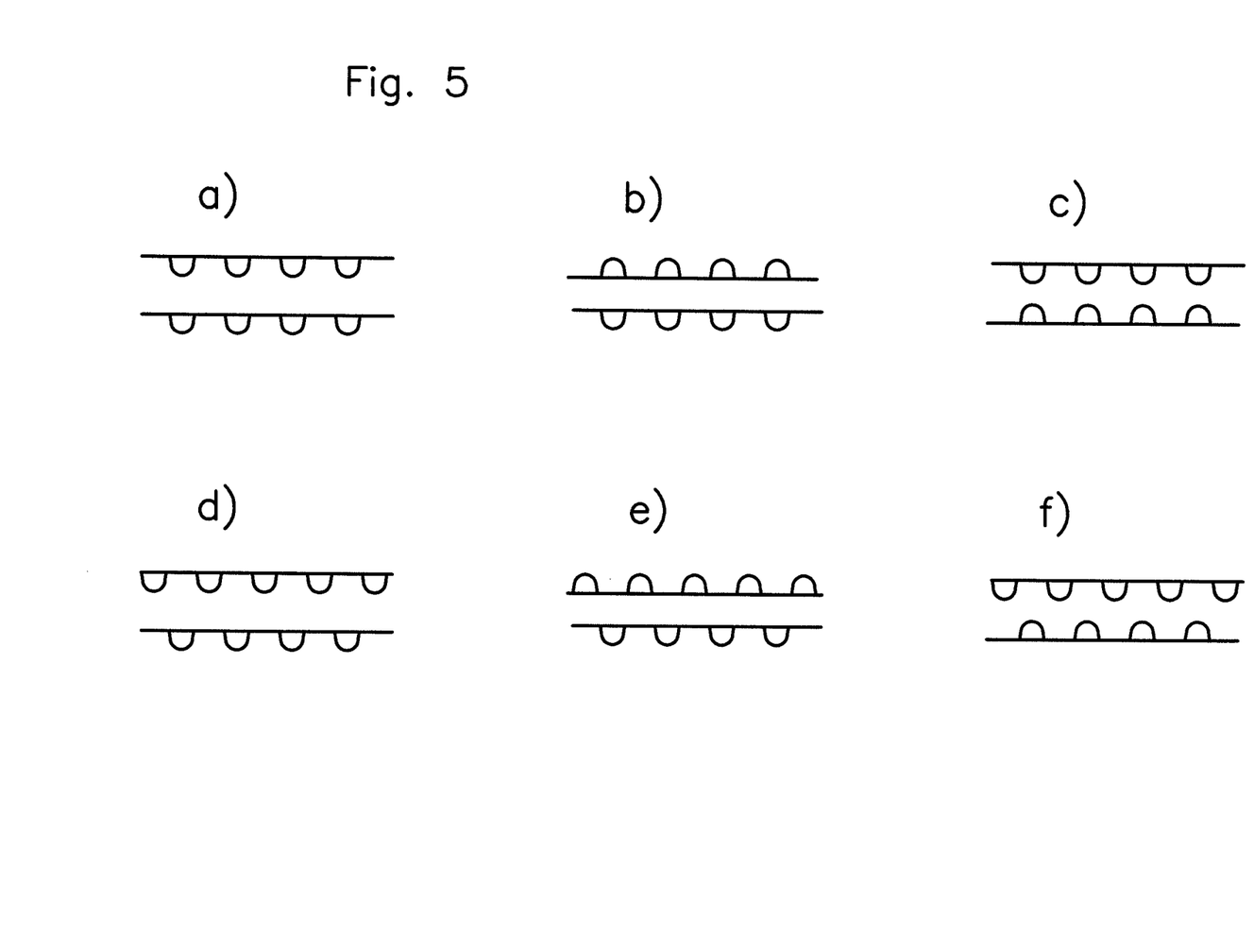
FIG. 5 Schematic cross sections through three-dimensional arrangements of two molded bodies with the hollow structures of the individual molded bodies disposed:
a) facing same direction, aligned in a column;
b) externally, facing opposite directions, aligned in a column;
c) internally, facing opposite directions, aligned in a column;
d) facing the same direction, staggered;
e) externally, facing in opposite directions, staggered;
f) internally, facing opposite directions, staggered.

FIG. 3 shows several options for arranged hollow structures in a single plane, while FIG. 4 shows possible spatial arrangements of molded bodies according to the invention. FIG. 5 shows several options for arranging two molded bodies in stacked or sandwich-type arrangements. The hollow structures of the individual molded bodies in this case can be oriented in the same (a, d) or in opposing directions (b, c, e, f), either in a row (a-c) or staggered (d-f) and/or can be directed toward the inside or the outside (c versus b; f versus e).

The method according to the invention was realized with a cast film of poly carbonate (PC), having a thickness of 50 μm. The film was irradiated at the linear accelerator UNILAC by the "GESELLSCHAFT FÜR SCHWERIONEN-FORSCHUNG" [Company for Heavy Ion Research] (GSI) in Darmstadt, Germany, using heavy ions of the type $^{132}Xe^{21+}$ with a specific energy of 11.4 MeV/nucleon and a fluence of $10^6$ ions/cm$^2$. The angle of irradiation relative to the surface of the film was 90°.

The film was subsequently dried in a vacuum for 45 minutes at 80° C. to prepare for the following micro thermoforming step. For the micro thermoforming, a mechanical pressure of 80 000N was applied, given a forming temperature of 164° C. and a gas pressure of 5 MPa (50 bar). The form release temperature was approximately 70° C. Obtained were hollow structures with a depth of approximately 240 μm to 250 μm.

A solution of 5N NaOH with 10% methanol was used as etching medium for the pore formation. The etching occurred over a period of 6 hours, at a temperature of 50° C., and result in pores ranging in size from 4 μm to 5 μm.

Figure 6:
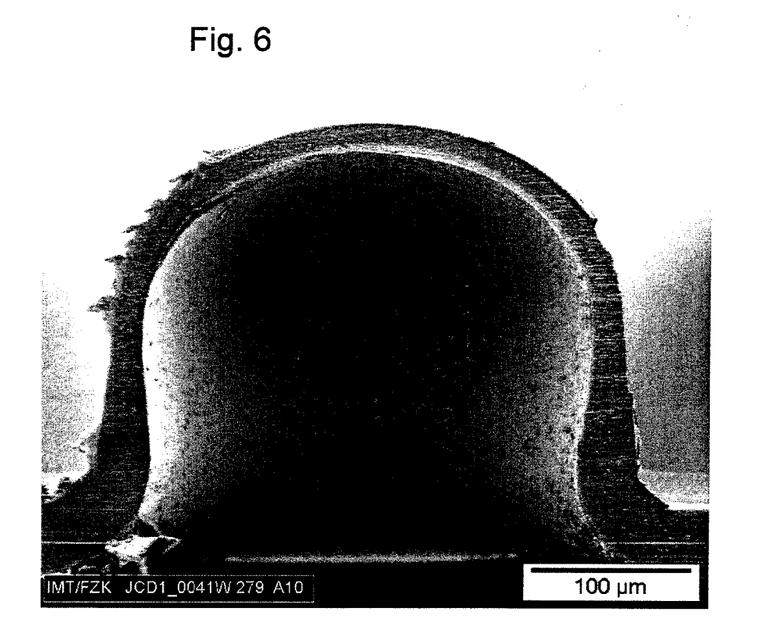
FIG. 6 Scanning electron microscope image of the section through a hollow structure, prior to the method step d).

FIG. 6 shows the scanning electron microscope image of a section through a hollow structure (cavity) configured in a micro thermoformed 50 μm thick film of polycarbonate (PC). The maximum depth of the structure is approximately 250 μm while the depth in the cutting plane is somewhat lower. The film was irradiated with heavy ions prior to the thermoforming operation.

Figure 7:
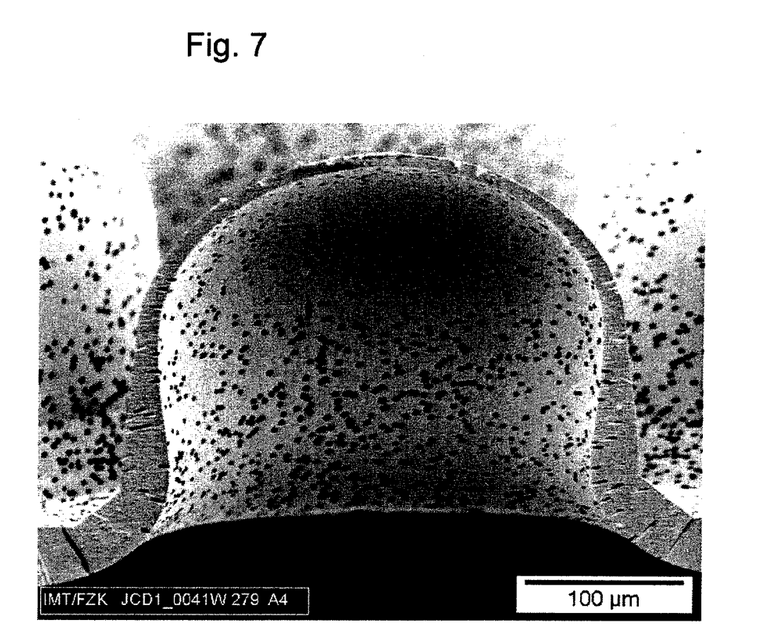
FIG. 7 Scanning electron microscope image of a section through the hollow structure shown in FIG. 6, following the method step d).

FIG. 7 shows a scanning electron microscope image of the section through the hollow structure in the micro thermoformed film of polycarbonate (PC), previously shown in FIG. 6, following the etching step. The interconnectedness of the pores is clearly visible in some areas. The orientation of the pores does not precisely coincide with the cutting plane, so that the cross sections of only a few pores can be seen in their full length.

Figure 8:
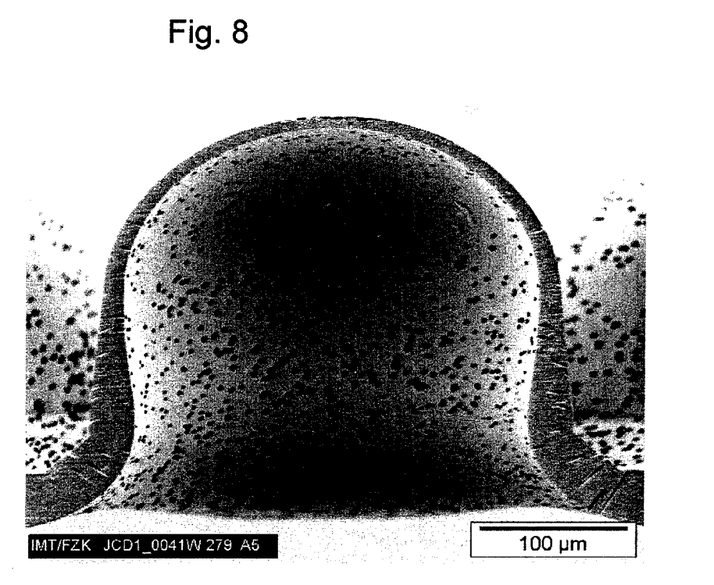
FIG. 8 Scanning electron microscope image of a different section through a hollow structure, following the method step d).

FIG. 8 illustrates the scanning electron microscope image of a different section through a hollow structure in the micro thermoformed film of polycarbonate (PC) that is already shown in FIG. 6, following the method step d). The interconnectedness of the pores is again clearly visible in some areas.

Figure 9:
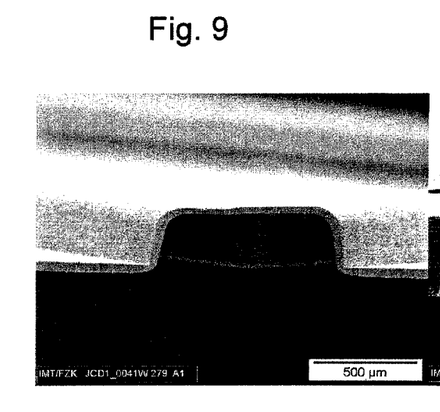
FIG. 9 A section through the outside region of the molded body shown in FIGS. 6 to 8 (single structure).
Figure 10:
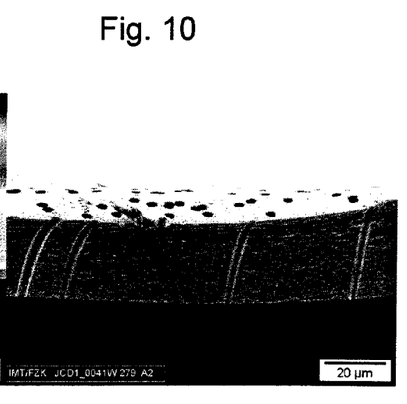
FIG. 10 A detail from FIG. 9 for further demonstrating the interconnectedness of the pores.

FIG. 9 contains a section through the outside region of the micro thermoformed film of polycarbonate (single structure), already shown in FIGS. 5 to 8. FIG. 10 contains an enlarged detail from FIG. 9, which also shows the interconnectedness of the pores.

The invention claimed is:

1. A method for producing a molded body, said method comprising:
   providing a film comprising a thermoplastic plastic and having a film thickness D ranging from 1 μm to 1000 μm;
   irradiating the film with ionizing radiation, to produce an irradiated film having irradiated regions having a radiation dose;
   thermally reshaping the irradiated film into a molded body so that a correlation between the radiation dose and the irradiated region is not lost and generating at least one hollow structure, wherein a temperature of the thermal reshaping remains below the melting temperature for the thermoplastic plastic, wherein the at least one hollow structure comprises:
      an outside diameter d equal to at least double a value of the film thickness D,
      a height h equal to or less than double the value of the outside diameter d,
      a wall thickness b greater than 0.02 times the film thickness D and less than or equal to the film thickness D, and
      a local curvature radius r greater than 0.2 times and less than or equal to 5 times the wall thickness b;
   removing the irradiated regions, to create pores having a diameter δ from about 10 nm to about 10 μm in the molded body, and
   removing the molded body from a mold.

2. The method according to claim 1, wherein the film is irradiated through a mask.

3. The method according to claim 2, wherein the film is irradiated with heavy ions.

4. The method according to claim 3, wherein the heavy ions have a prespecified energy above 0.1 MeV/nucleon.

5. The method according to claim 1, wherein the irradiated regions are removed via a wet-chemical etching process.

* * * * *